United States Patent [19]

SäynjäKangas

[11] Patent Number: 4,586,374
[45] Date of Patent: May 6, 1986

[54] PROCEDURE AND MEANS FOR WIRELESS MEASUREMENT OF THE SPEED OF SMALL CRAFT SUCH AS A SURFBOARD OR A BOAT

[76] Inventor: Seppo SäynjäKangas, Takatie, 90440 Kempele, Finland

[21] Appl. No.: 698,614

[22] Filed: Feb. 6, 1985

[30] Foreign Application Priority Data

Feb. 6, 1984 [FI] Finland .................................. 840464

[51] Int. Cl.$^4$ ............................................. G01C 21/10
[52] U.S. Cl. ....................................................... 73/187
[58] Field of Search ............ 73/187, 185, 181, 861.77, 73/861.78; 340/606

[56] References Cited

U.S. PATENT DOCUMENTS 3,614,760 10/1971 Zimmet ................................ 340/606
4,535,626 8/1985 Wakayama ............................ 73/187

FOREIGN PATENT DOCUMENTS 0210519 12/1983 Japan ................................. 73/861.78

Primary Examiner—Donald O. Woodiel
Attorney, Agent, or Firm—Toren, McGeady, Stanger, Goldberg & Kiel

[57] ABSTRACT

A procedure and apparatus for wireless measurement of the speed of a small craft, such as a surfboard or a boat, wherein the speed of the craft is measured with the aid of a speed pick-up by means of a separate measuring and transmitting device attached to the craft's bottom and in wireless fashion transmitted to a separate receiver device. In order to achieve efficient wireless measurement, the speed of the craft is detected from the voltage induced in the windings of an electric generator connected to a rotating speed measuring element and is telemetrically transmitted to the receiver device by using a magnetic field, and the electric energy required for the transmitter device is formed of the voltage induced by said electric generator.

6 Claims, 7 Drawing Figures

4,586,374

PROCEDURE AND MEANS FOR WIRELESS MEASUREMENT OF THE SPEED OF SMALL CRAFT SUCH AS A SURFBOARD OR A BOAT

BACKGROUND OF THE INVENTION

The present invention concerns a procedure and a means for wireless speed measurement in the case of small craft, for instance a surfboard or a boat, in said procedure the speed of the craft being measured with the aid of a speed pick-up using a separate measuring and transmitting device attached to the bottom of the craft and being by wireless means transmitted to a separate receiver device It is important in boating and surfboarding to know the speed of the boat or surfboard relative to the water and to furnish the driver with a continuous speed measurement output. An exceedingly difficult measuring problem is imposed by the use of traditional speed measuring instruments in surfboarding. The surfboard is a comparatively light and small thing that can for instance be transported on a cartop and on which it is usually difficult to mount any permanent measuring apparatus or accessories. From the viewpoint of installation, the placement and fixing of electronic measuring instruments, and likewise the electric wiring, give rise to a problem which is hard to solve in practice.

Although traditional speed-measuring instruments used in boating are already in themselves well operating and usable, the way of measurement implemented by the procedure of the invention affords a reliable and simple way to measure by wireless means the speed of a surfboard or of a boat. The small wireless receiver means is without difficulty placeable at a convenient point in the boat or on the surfboard, or it may for that matter be carried on the wrist, for monitoring the speed.

SUMMARY OF THE INVENTION

The procedure of the invention is characterized in that the speed of the craft is detected through the voltage induced in the windings of an electric generator coupled to a rotating speed measuring element and is telemetrically transmitted to the receiver means, employing a magnetic field, and that the electric power which the transmitter means needs is formed from the voltage induced by said electric generator.

The procedure of the invention is further characterized in that telemetric data transfer is implemented by controlling with the a.c. voltage induced in the windings of the electric generator magnet coils placed in the transmitter device, the magnetic field produced by them being detected in the receiver device with a coil structure having a magnetic field pattern which is at least partly equivalent.

Telemetric data transfer takes place by controlling with the alternating signal, pulsed in the transmitter device and representing the speed, magnet coils producing a magnetic field which is essentially multi-dimensional and by detecting said magnetic field with a coil structure having a multi-dimensional magnetic field which is at least partly equivalent.

In the receiver have in equivalent manner been disposed three mutually perpendicularly placed, separate winding elements for detection of the magnetic field produced around the transmitter. It is possible in this way to receive, reliably and without harmful interruptions, the pulse-shaped transmission signal which is proportional to the speed.

Apparatus built in accordance with the procedure just described has been found to operate exceedingly well also in practice and to be fully usable even under the most adverse weather conditions. The measuring method based on the use of a magnetic field which is disclosed is moreover one of the measuring and data transfer methods able to operate under water, which are few indeed.

Other advantageous embodiments of the procedure of the invention are characterized by that which is stated in the claims following farther below.

A device carrying out the procedure of the invention, composed of a measuring and transmitting device with speed pick-up, attached to the bottom of the craft, and of a separate receiver device, is characterized in that the transmitter device comprises a rotating speed measuring element for measuring speed, an electric generator connected in conjunction therewith, and a transmitter that can be keyed with the voltage induced in the windings of the generator, for telemetrically transmitting the speed data to the receiver device by the aid of a magnetic field.

With the three-dimensional coil structures of the transmitter device and the receiver device is through the cooperation of the structures achieved nearly spherically symmetric measurement in the surroundings of the transmitter device and, thereby, a highly reliable and uninterrupted data transfer connection between the transmitter and receiver devices.

Other advantageous embodiments of the means of the invention are mainly characterized by that which has been stated in the claims following farther below.

BRIEF DESCRIPTION OF THE DRAWINGS

The invention is described in the following with the aid of certain advantageous embodiments and figures, referring to the attached drawings, wherein.

DESCRIPTION OF THE PREFERRED EMBODIMENTS

Figure 1:
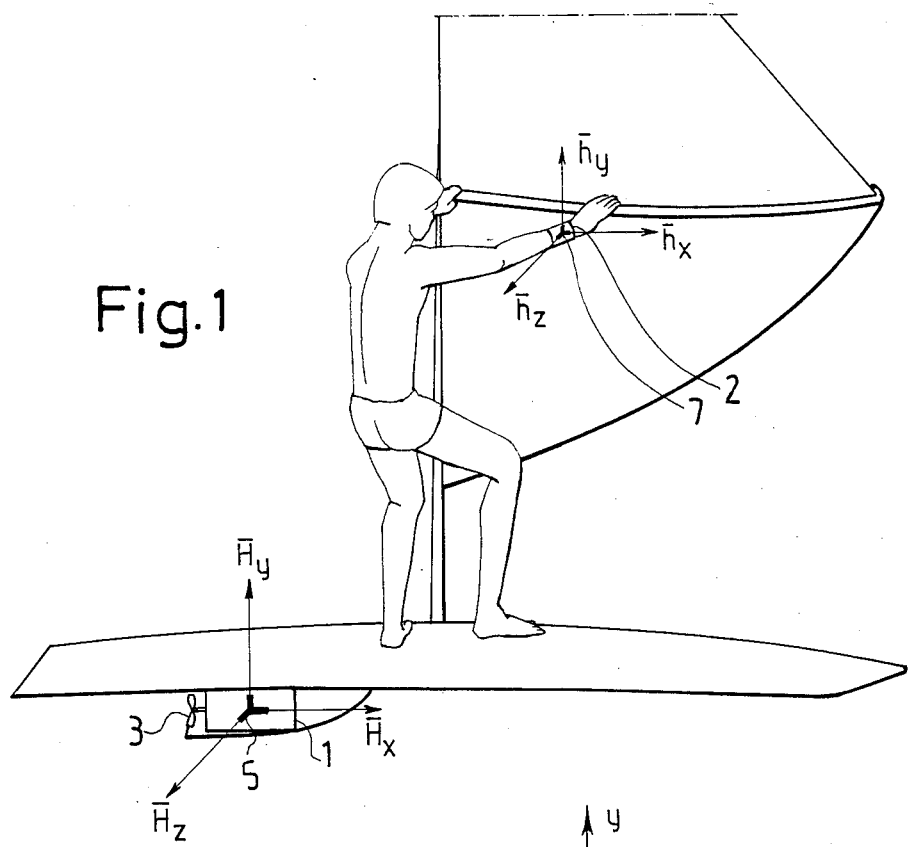
FIG. 1 presents a means according to the invention, applied to a surfboard.

As taught by the invention, the speed of the surfboard is measured as shown in FIG. 1 with a rotating velocity or flow rate pick-up 3, which has been fixedly mounted in the transmitter device 1. With the velocity pick-up 3, the speed of the surfborad or boat is measured and converted into a.c. signals supplying the magnet coils 5. The a.c. signals produce, as they flow through the coils, simultaneously in the surroundings of each coil 5 the corresponding magnetic fields $H_x$, $H_y$ and $H_z$.

Similarly, the three coils 7 mounted in the receiver device 2 perpendicular to each other measure in the surroundings of the receiver device 2 the magnetic fields $h_x$, $h_y$ and $h_z$. Independent of the changes in the positions of the coils in relation to each other caused by movements of the users' body, the design just described guarantees that in virtually any position always one of the receiver coils 7 is enabled to detect the magnetic field generated by the coils 5 of the transmitter device.

Figure 2A:
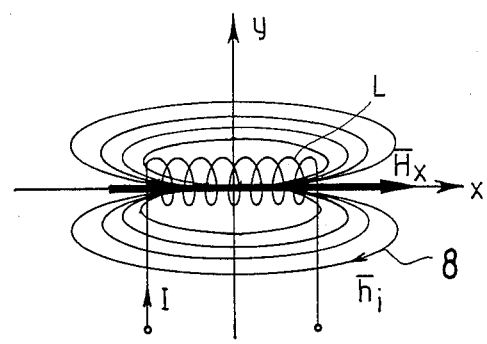
FIG. 2a illustrates the directional pattern of the magnetic field produced by the magnetic coil, in x-y coordinates.
Figure 2B:
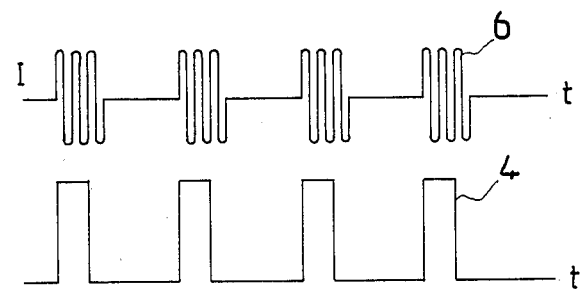
FIG. 2b displays the curve shapes of the pulse-shaped signal corresponding to the speed of the craft and of the a.c. signal supplied to the magnet coils which has been keyed therewith and creates the magnetic field.

The electronic unit of the transmitter device 1 comprises a pick-up amplifier by the aid of which is detected the speed of rotation of the electric generator mounted on one shaft with the speed pick-up and the a.c. voltage thus measured is amplified to a suitable voltage level. The voltage is then converted into a pulse-shaped signal 4 as shown in FIG. 2b. In FIG. 2a has been presented a magnet coil L through which has been arranged to flow an a.c. signal 6 keyed with a pulse-shaped signal 4 corresponding to the speed of the surfboard or boat as shown in FIG. 2b.

The a.c. signal 6 generates, as it flows through the coil L, a directional magnetic filed $H_x$. The distribution of this magnetic field around the coil L can be illustrated by equipotential flux lines 8. The magnetic field $h_i$ which is measurable point by point in the surroundings of the coil L has always the direction of one closed flux line. It is well known that this field $h_i$ varies most strongly as regards both direction and field strength, and this fact impedes the detection of a magnetic field produced by one single magnet coil.

Figure 3:
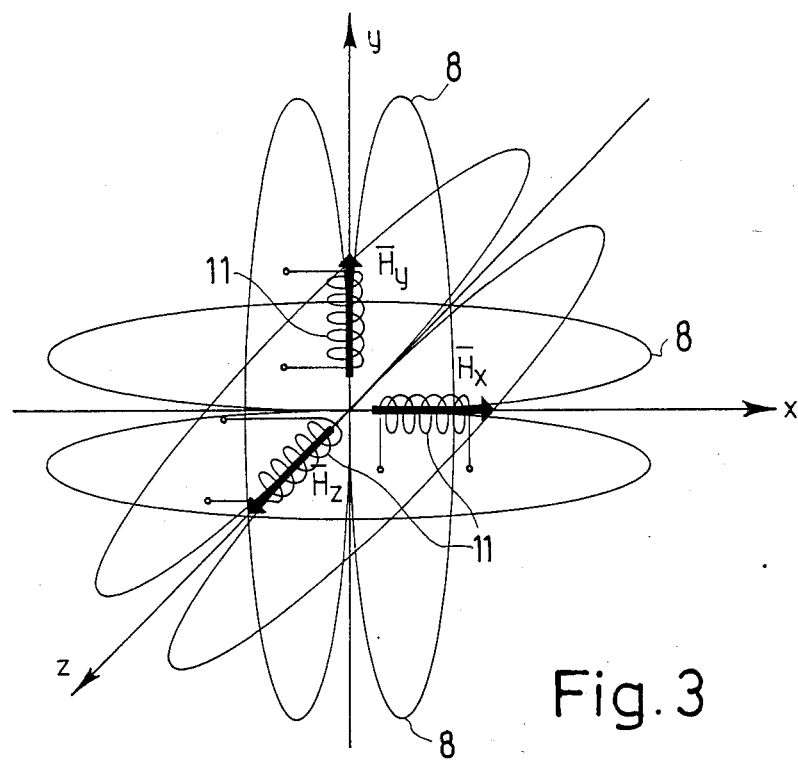
FIG. 3 displays the directional pattern of the magnetic field produced by three magnet coils, in x-y-z coordinates.

In FIG. 3 have been displayed, in x-y-z coordinates, the magnetic fields $H_x$, $H_y$ and $H_z$, produced with the a.c. signal 6, of three magnet coils mounted perpendicular to each other, 11. The directional pattern of the magnetic fields produced by the joint action of the coils 11 is symmetrical in the x, y and z directions, but shadow regions occur in the field pattern where the magnetic field still varies very strongly as regards direction and strength. By using in the receiver device 2 toward the measurement of the magnetic field thus produced, likewise, a coil structure 7 measuring in three mutually perpendicular directions, one obtains by cooperation between the structures just presented, a measuring method between the transmitter device 1 and the receiver device 2 which operates in nearly spherically symmetric fashion.

Figure 4:
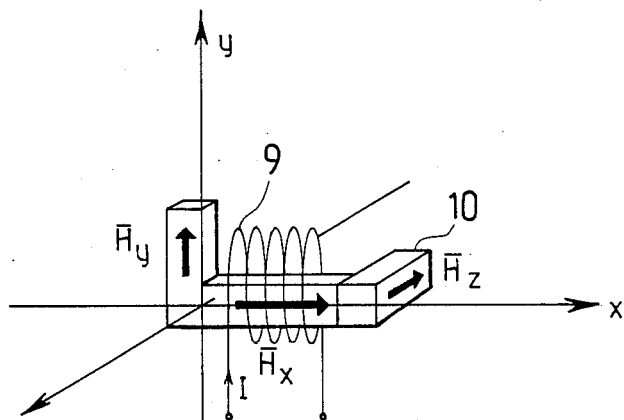
FIG. 4 displays the magnetic field vectors produced by a three-dimensional coil with ferrite core, in x-y-z coordinates.

In FIG. 4 is presented another embodiment of the means of the invention with one coil winding 9 which has been provided with three mutually perpendicular parts of the ferrite core 10, the magnetic field vectors produced by these core parts being $H_x$, $H_y$ and $H_z$. The a.c. signal 6 supplied to a coil winding of this kind produces in the surroundings of the coil winding a magnetic field which is measurable in all directions x, y and z. By the structure presented may be replaced three separate coils 11 both in the transmitter device 1 and in the receiver device 2 and thus a similar measuring method with a nearly spherically symmetric data transfer field obtained.

Figure 5:
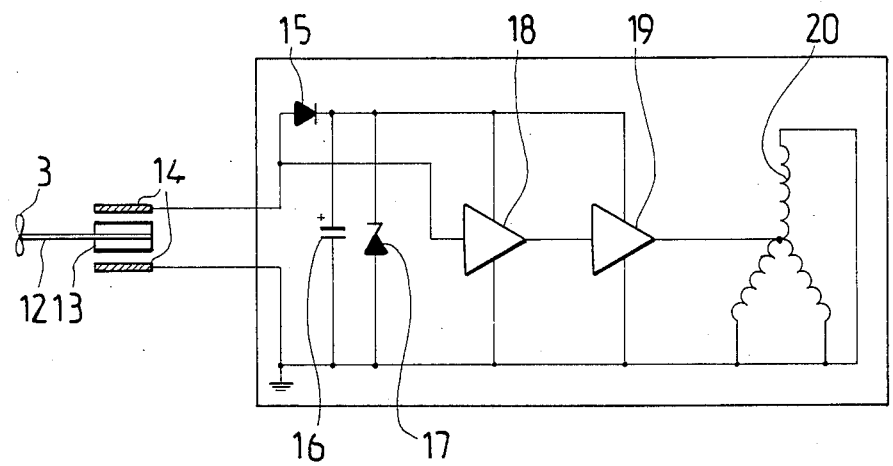
FIG. 5 presents in the shape of a block diagram the circuit of the transmitter part of a means according to the invention in a measuring apparatus measuring the speed of a surfboard or of a boat.

To the shaft of the speed pick-up has been fixedly connected, as shown in FIG. 5. a small-sized electric generator, which when the shaft 13 connected to its rotor 12 rotates induces in the windings 14 an electric alternating voltage. This a.c. voltage is rectified and stabilized in a regulator, rectifying is performed through the diode 15 into the capacitor 16, the electric voltage charged here being stabilized with a Zener diode 17 to be the operating voltage of the entire transmitter electronics. The pick-up amplifier 18 is used to control the power amplifier 19, where the a.c. signal 6 controlling the coils 20 is produced.

Figure 6:
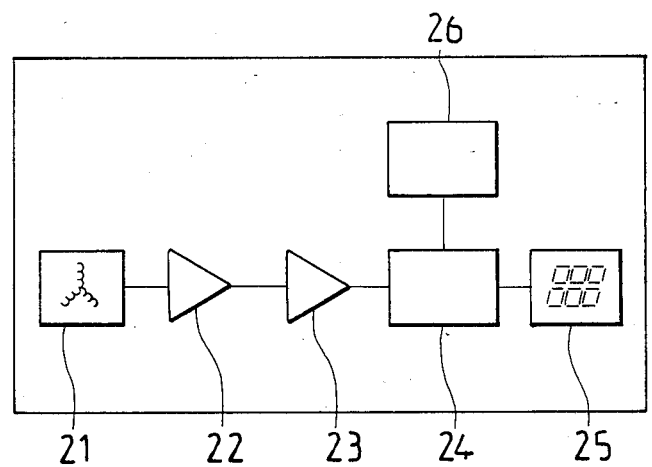
FIG. 6 presents in the shape of a block diagram the circuit of the receiver part of a means according to the invention in a measuring apparatus measuring the speed of a surfboard or of a boat.

In FIG. 6 has been presented the electronic implementation of the receiver device 2. The magnetic field detcted by the receiver coils 21 is amplified in a sensitive preamplifier 22, whereupon the signal is converted in the pulse amplifier 23 once again into pulse configuration, and it is carried to be processed in a microcomputer 24. The microcomputer determines from the pulse-shaped signal the speed of the surfboard or boat and outputs this by its liquid crystal display 25. The microcomputer may also record speed data in its memory 26, from which they may be output later on either by the liquid crystal display 25 or by other output means.

It is obvious to a person skilled in the art that different embodiments of the invention are not exclusively confined to that which has been presented in the foregoing and that they may vary within the scope of the claims following below.

I claim:

1. A procedure for wireless measurement of the speed of a small craft, such as a surfboard or a boat, wherein the speed of the craft is measured with the aid of a speed pick-up by means of a separate measuring and transmitting device attached to the craft's bottom and in wireless fashion transmitted to a separate receiver device, wherein the speed of the craft is detected from the voltage induced in the windings of an electric generator connected to a rotating speed measuring element and is telemetrically transmitted to the receiver device by using a magnetic field and that the electric energy required for the transmitter device is formed of the voltage induced by said electric generator.

2. Procedure according to claim 1, wherein the telemetric power transfer is accomplished by controlling with the voltage induced in the windings of the electric generator magnet coils placed in the transmitter device, the magnetic field produced by them being detected in the receiver device with a coil structure having a magnetic field directional pattern which is at least partly equivalent.

3. Procedure according to claim 1, wherein the alternating voltage induced by the speed measuring element in the generator is used both as speed measurement data to be keyed into the magnet coils and, after rectifying and stabilizing, as operating voltage for the transmitter device.

4. A means implementing a procedure according to claim 1 for wireless speed measurement of a craft, such as a surfboard or a boat, said means consisting of a measuring and transmitting device provided with a speed pick-up and attached to the craft's bottom and of a separate receiver device, wherein the transmitter device comprises a rotating speed measuring element for measuring the craft's speed, an electric generator connectyed in its conjunction, and a transmitter keyable with the voltage induced in the windings of the generator for telemetric transmission of the speed data to the receiver device with the aid of a magnetic field.

5. Means according to claim 4, wherein the transmitter and receiver means contain magnet coils keyable with alternating current towards carrying out telemetric data transfer and which have three-dimensional, substantially spherically symmetric magnetic field patterns.

6. Means according to claim 4, wherein the alternating voltage induced in the generator by the speed measuring element is used to control both the magnet coils of the transmitter device and after rectifying and stabilizing as operating voltage for the transmitter device.

* * * * *

UNITED STATES PATENT AND TRADEMARK OFFICE
CERTIFICATE OF CORRECTION

PATENT NO. : 4,586,374
DATED      : May 6, 1986
INVENTOR(S): Seppo Säynäjäkangas It is certified that error appears in the above-identified patent and that said Letters Patent is hereby corrected as shown below:

On the title page:

In the heading of the patent it should read:

-- [76]  Inventor:  Seppo Säynäjäkangas, Takatie, 90440 Kempele, Finland --

Signed and Sealed this

Twenty-ninth Day of July 1986

[SEAL]

Attest:

Attesting Officer

DONALD J. QUIGG

Commissioner of Patents and Trademarks